(12) United States Patent
Sasaya

(10) Patent No.: US 11,599,784 B2
(45) Date of Patent: Mar. 7, 2023

(54) SIGNAL PROCESSING DEVICE, SIGNAL PROCESSING METHOD, AND COMPUTER PROGRAM PRODUCT

(71) Applicant: Kabushiki Kaisha Toshiba, Minato-ku (JP)

(72) Inventor: Tenta Sasaya, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 1135 days.

(21) Appl. No.: 16/117,350

(22) Filed: Aug. 30, 2018

(65) Prior Publication Data

US 2019/0294963 A1    Sep. 26, 2019

(30) Foreign Application Priority Data

Mar. 20, 2018 (JP) .............................. JP2018-052404

(51) Int. Cl.
| | |
|---|---|
| *G06N 3/08* | (2006.01) |
| *G06F 40/44* | (2020.01) |
| *G06V 10/82* | (2022.01) |
| *G06F 17/18* | (2006.01) |
| *G06K 9/62* | (2022.01) |
| *G10L 15/16* | (2006.01) |

(52) U.S. Cl.
CPC .............. *G06N 3/08* (2013.01); *G06F 17/18* (2013.01); *G06F 40/44* (2020.01); *G06K 9/6267* (2013.01); *G06V 10/82* (2022.01); *G10L 15/16* (2013.01)

(58) Field of Classification Search
CPC .......... G06N 3/08; G06V 10/82; G06F 17/18; G06F 40/44; G06K 9/6267; G10L 15/16
See application file for complete search history.

(56) References Cited

U.S. PATENT DOCUMENTS

| | | | |
|---|---|---|---|
| 2018/0061439 A1* | 3/2018 | Diamos | ................... G10L 15/24 |
| 2018/0211164 A1* | 7/2018 | Bazrafkan | ............ G06N 3/0454 |

OTHER PUBLICATIONS

K. Zhang et al. "Beyond a Gaussian Denoiser : Residual Learning of Deep CNN for Image Denoising" IEEE Trans. Image Process. vol. 26, No. 7, 2017, pp. 13.

* cited by examiner

*Primary Examiner* — Sonia L Gay
(74) *Attorney, Agent, or Firm* — Oblon, McClelland, Maier & Neustadt, L.L.P.

(57) ABSTRACT

A signal processing apparatus includes one or more processors. The one or more processors perform first-type signal processing on an input signal using a neural network, and output a first-type output signal. The one or more processors convert the first-type output signal into a second-type output signal for calculating a first-type loss related to accuracy of second-type signal processing performed by another signal processing device The one or more processors calculate the first-type loss based on the second-type output signal and a correct signal. The one or more processors optimize parameters of the neural network based on the first-type loss.

9 Claims, 12 Drawing Sheets

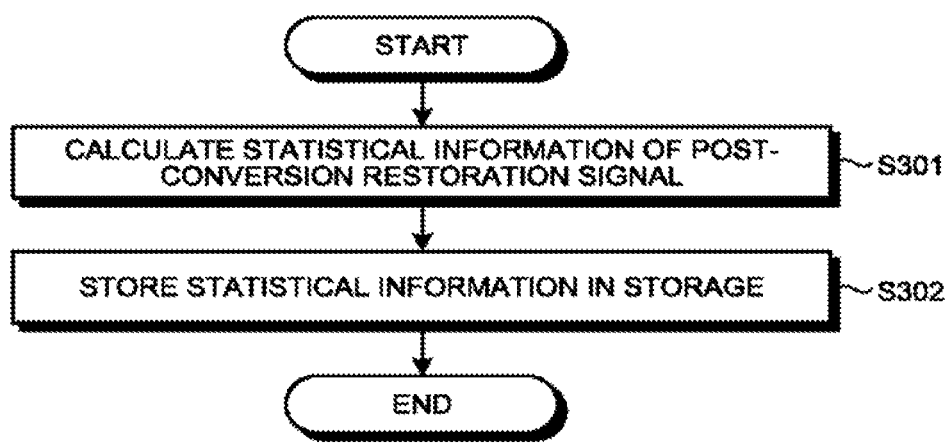
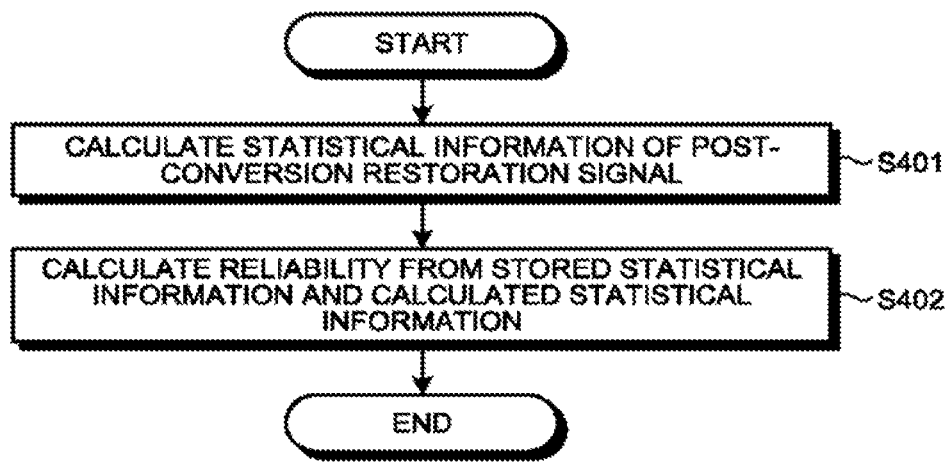

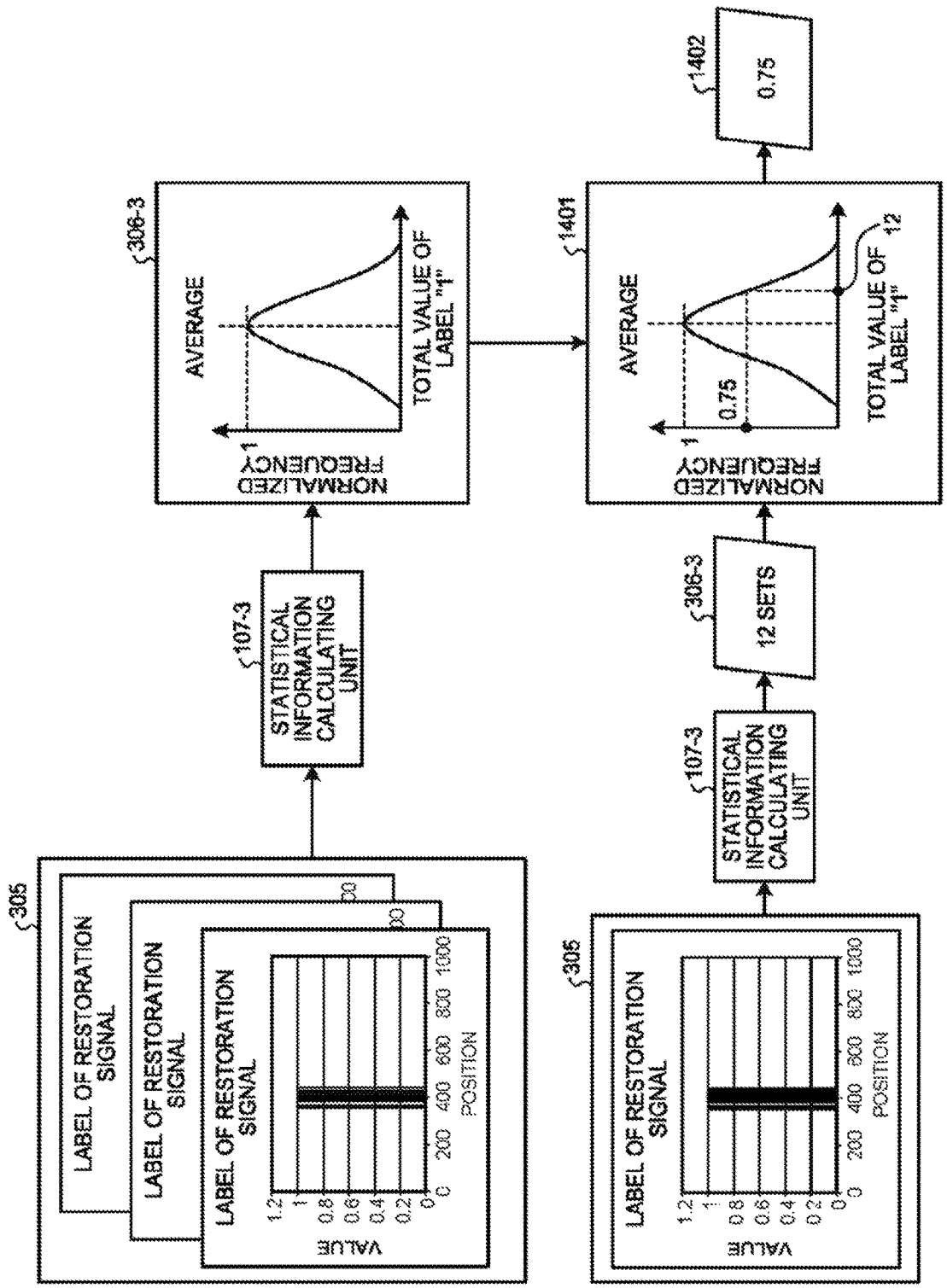

SIGNAL PROCESSING DEVICE, SIGNAL PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-052404, filed on Mar. 20, 2018; the entire contents of which are incorporated herein by reference.

FIELD

Embodiments described herein relate generally to a signal processing device, a signal processing method, and a computer program product.

BACKGROUND

In recent years, there has been a remarkable advancement in the recognition for sensor signals (one dimensional signals or images) using a neural network, and the advancement is not limited to the academic field but also can be seen in the industrial applications represented by automated driving. However, most of those recognition techniques in the academic field have developed on the assumption that the sensor signals are high signal-to-noise (SN) ratio, so in the case of the recognition for industrial applications, it needs preprocessing of sensor signals for removing unnecessary components (such as noise).

However, the conventional techniques may face the situation that the latter-stage signal processing (such as the recognition) cannot achieve high accuracy, even if using signal processing such as noise removal in advance.

BRIEF DESCRIPTION OF THE DRAWINGS

FIG. 12 is a flowchart for explaining an example of a statistical information calculation operation according to the third embodiment;

FIG. 13 is a flowchart for explaining an example of a reliability degree calculation operation according to the third embodiment;

FIG. 14 is a diagram for explaining an example of a method for calculating the statistical information and the reliability.

DETAILED DESCRIPTION

Figure 1:
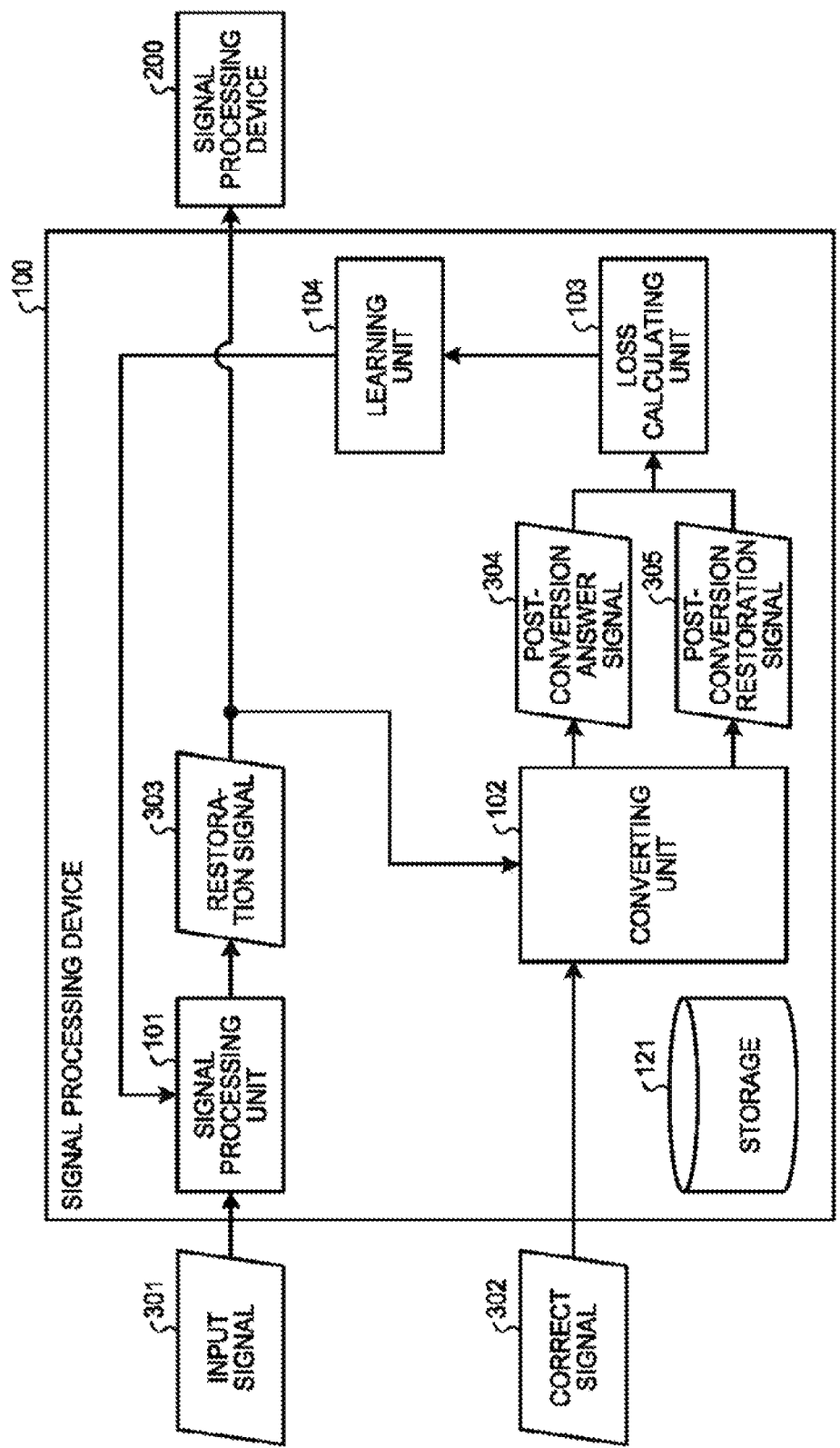
FIG. 1 is a block diagram of a signal processing device according to a first embodiment.

According to one embodiment, a signal processing apparatus includes one or more processors. The one or more processors perform first-type signal processing on an input signal using a neural network, and output a first-type output signal. The one or more processors convert the first-type output signal into a second-type output signal for calculating a first-type loss related to accuracy of second-type signal processing performed by another signal processing device. The one or more processors calculate the first-type loss based on the second-type output signal and a correct signal. The one or more processors optimize parameters of the neural network based on the first-type loss Preferred embodiments of a signal processing device according to the invention are described below in detail with reference to the accompanying drawings.

One of the famous preprocessing for the signal processing (such as a recognition) is signal restoration (such as noise removal). However, the signal processing as the preprocessing regarding which the embodiments described below are to be implemented is not limited to the signal restoration, and any type of signal processing can be considered.

The signal restoration technique has been researched for years, and there are many effective methods regarding the standard case in which the noise intensity is smaller than the signal intensity. Meanwhile, if the noise intensity is greater than the signal intensity (SN ratio is significantly low), no effective method has been developed.

Examples of the scenario in which the SN ratio of signals is significantly low include the following:

The target signal intensity is weak because of the measurement intended for early anomaly detection or symptom detection.

Increasing the noise intensity due to restrictions on the measurement time or the disturbance peculiar to the environment.

Meanwhile, a method using a neural network has been developed not only for the recognition but also for the signal processing that serves as preprocessing. One of neural networks called convolutional neural network achieve state-of-the-art performance on signal restoration task The convolutional neural network can learn signal filtering performed in conventional signal processing. Since most of the signal restoration techniques using a convolutional neural network has been developed on the assumption that noise intensity is small, then optimization based on square error loss enables to achieve sufficient noise removal performance. However, in case of extremely low SN ratio of the measured signals as mentioned earlier, off-the-shelf neural networks may encounter a difficult problem.

For example, when the noise intensity is high, optimized neural network based on the square error tends to suppress the signal components. In particular, when the noise intensity is higher than the intensity of desired signals, the square error can be substantially reduced by suppressing the overall signal intensity. In such a case, even if signal processing such as noise removal is performed according to the conventional method, it is not possible to obtain restored signals which improve latter-stage signal processing performance. As a result, the latter-stage signal processing cannot achieve high accuracy.

First Embodiment

In a first embodiment, the early-stage signal processing is learnt using the loss related to the accuracy of the latter-stage signal processing. For example, in the first embodiment, output signals from the early-stage signal processing are converted into output signals meant for calculating the loss related to the accuracy of the latter-stage signal processing, and the loss is calculated using the post-conversion output signals. Then, the parameters of a neural network used in the early-stage signal processing are optimized by the calculated loss.

In this way, in the first embodiment, the early-stage signal processing such as the signal restoration is considered to be the target along with the operation form including the latter-stage signal processing which process the output signals from the early-stage signal processing. According to the first embodiment, the latter-stage signal processing can achieve a higher accuracy. For example, even when the input signals include a large amount of noise; the signal restoration by signal processing unit can properly suppress the noise, without suppressing the signal components.

The following explanation is given about a flow of parameter optimization of a neural network. A neural network implies a function for outputting a desired signal y from an input signal x by a combination of linear transformation of a network parameter W (a weight matrix) and nonlinear transformation of an activation function $f(\cdot)$. At the time of learning, a loss function $E(W)$ representing the error between correct data t respect to the input signal and the signal y is defined in advance.

Herein, learning by a neural network is equivalent to solve the minimization problem of the loss; and represents an operation based on the gradient obtained by partial differentiation of the loss with respect to a network parameter W, then the network parameter W is repeatedly updated by the gradient method. Moreover, since the loss function has a nested structure including the activation function, a method called back-propagation is commonly used for calculating partial differentiation in an efficient manner.

FIG. 1 is a block diagram illustrating an exemplary configuration of a signal processing device 100 according to the first embodiment. The signal processing device 100 illustrated in FIG. 1 includes a signal processing unit 101, a converting unit 102, a loss calculating unit 103, a learning unit 104, and storage 121. The signal processing device 100 receives input of an input signal 301 and a correct signal 302, and outputs a restoration signal 303 to a signal processing device 200.

The input signal 301 represents at least one or more multidimensional signals. For example, a multidimensional signal is an image or a sound signal, but can alternatively be any other type of signal. A plurality of multidimensional signals obtained by dividing an image or a sound signal into sub-sections (such as frames) can be input as input signals. Meanwhile, multidimensional signals can also be time-series signals.

The signal processing unit 101 performs signal processing (first-type signal processing) on the input signal 301 using a neural network, and outputs output signals (first-type output signals) representing the result of signal processing. For example, the signal processing unit 101 performs signal processing using a neural network meant for the signal restoration. The following explanation is given for an example in which mainly the restoration signal 303 representing the result of the signal restoration is output as the output signal.

Herein, the signal processing need not be of only one type, and can include a combination of two or more types of signal processing. Moreover, the neural network used in the signal processing unit 101 is optimized based on the loss calculated by the loss calculating unit 103.

The restoration signal 303 represents one or more multidimensional signals restored by a neural network. For example, the restoration signal 303 has the same number of dimensions as the input signal 301, and includes the same number of multidimensional signals as the input signal 301.

The signal processing device 200 performs predetermined signal processing (second-type signal processing) on the restoration signal 303. For example, the signal processing device 200 performs signal processing except the signal restoration by the signal processing unit 101. The signal processing performed by the signal processing device 200 includes, for example, at least one of classification, recognition, detection, segmentation, captioning, and machine translation. In an identical manner to examples illustrated in FIGS. 4 to 7 (described later), the two or more types operations can be performed in series, or performed in parallel, or performed by a combination of operations in series and operations in parallel. Moreover, a plurality of operations is performed in parallel, then those results can be merged into one signal.

The signal processing device 100 can be configured as a physically separated device from the signal processing device 200, or can be integrated in the signal processing device 200. Moreover, the functions of the signal processing device 100 can be provided in a dispersed manner among a plurality of physically separate devices. For example, at least some of the functions of the signal processing device 100 can be installed in a cloud server that performs processing on the cloud.

The correct signal 302 represents at least one or more multidimensional signals. For example, the correct signal 302 has the same number of dimensions as the restoration signal 303, and includes the same number of multidimensional signals as the restoration signal 303.

The converting unit 102 converts the restoration signal 303 into an output signal (second-type output signal) meant for calculating the loss (first-type loss) related to the accuracy of the signal processing by the signal processing device 200. Moreover, the converting unit 102 also converts the correct signal 302 in an identical manner to the conversion of the restoration signal 303. Namely, the converting unit 102 converts the restoration signal 303 into a post-conversion restoration signal 305, and converts the correct signal 302 into a post-conversion correct signal 304.

The conversion performed by the converting unit 102 can either be same as or be different from the signal processing performed on the signal processing device 200. For example, when the signal processing device 200 performs captioning, the converting unit 102 can perform captioning or image classification. Moreover, the converting unit 102 can perform the conversion by the conversion method specified by the signal processing device 200. For example, the converting unit 102 can receive processing details from the signal processing device 200 and, can perform identical signal processing to the signal processing based on the processing details in the signal processing device 200. When the signal processing device 200 performs signal processing using a neural network, the converting unit 102 can receive, for example, the network structure and the pre-trained parameters as the processing details.

Based on the post-conversion restoration signal 305 and the post-conversion correct signal 304, the loss calculating unit 103 calculates the loss related to the processing accuracy of the signal processing device 200. For example, the loss calculated by the loss calculating unit 103 can be set as an index using any one of following items or using a combination of two or more of the following items.

True positive ratio
False positive ratio
Precision
Recall
Accuracy
F-measure
AUC (Area Under the ROC Curve)
Contrastive loss
Triplet loss
Cross entropy
Kullback-Leibler (KL) divergence
Jensen Shannon (JS) divergence
Wasserstein distance
IoU (Intersection of Union)
BLEU (Bilingual Evaluation Understudy) score
WER (Word Error Rate)
METEOR (Metric for Evaluation of Translation with Explicit ORdering)

For example, when the signal processing device 200 performs classification as the signal processing, the loss calculating unit 103 can output either only the cross entropy or an index formed by combining the cross entropy and the AUC obtained by some sort of calculations.

The learning unit 104 uses the calculated loss and updates the parameters of the neural network used in the signal processing unit 101. For example, the learning unit 104 calculates the gradient of the loss by the back-propagation, and updates the parameters of the neural network by a gradient method. Herein, the gradient calculation method is not limited to the back-propagation, and any other method can be implemented.

The type of the loss used in the learning unit 104 can change one or more times during the optimization of the neural network. For example, when the signal processing device 200 performs classification as the signal processing, the learning unit 104 performs optimization based on cross entropy as the loss in the early stages of learning and using the AUC as the loss in the closing stages of learning. As a result of using the continuously-changing cross entropy as the loss in the early stages of learning, it is expected that stagnation of learning is avoided; and, as a result of using the discretely-changing AUC as the loss in the closing stages of learning, it is expected that the learning converges.

The storage 121 store various information used in the signal processing device 100. For example, the storage 121 store information including the parameters of the neural network that is used in the signal processing unit 101; input information (such as the input signal 301); intermediate data of various operations; and information indicating the processing result (such as restoration signals).

The storage 121 can be configured using any one of the commonly-used storage mediums such as a hard disk drive (HDD), an optical disk, a memory card, or a random access memory (RAM).

Meanwhile, the abovementioned constituent elements (the signal processing unit 101, the converting unit 102, the loss calculating unit 103, and the learning unit 104) are implemented, for example, using one or more processors. For example, the constituent elements can be implemented by making a processor such as a central processing unit (CPU) execute a computer program, that is, can be implemented using software. Alternatively, the constituent elements can be implemented using a processor such as a dedicated, integrated circuit (IC), that is, can be implemented using hardware. Still alternatively, the constituent elements can be implemented using a combination of software and hardware. In the case of using a plurality of processors, each processor can be configured to implement either one constituent element or two or more constituent elements.

Figure 2:
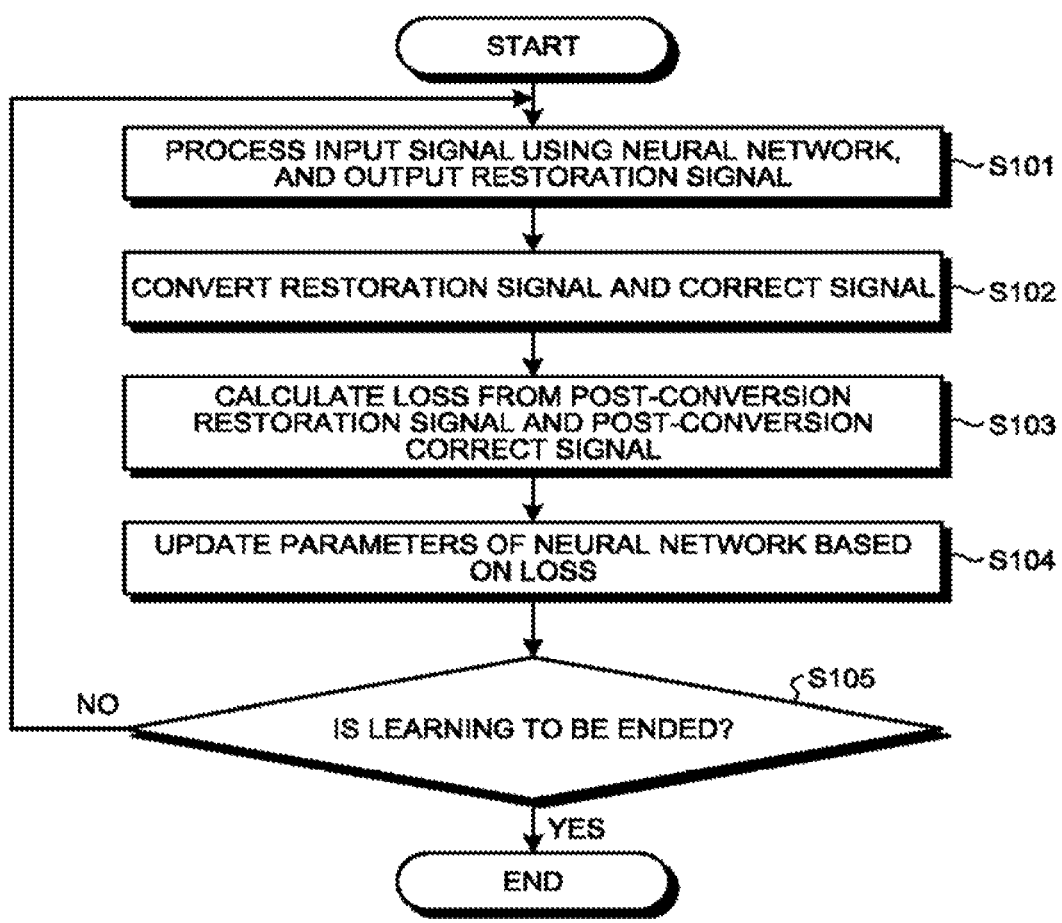
FIG. 2 is a flowchart for explaining an example of a learning operation according to the first embodiment.

Explained below with reference to FIG. 2 is a learning operation performed by the signal processing device 100 that is configured in the abovementioned manner according to the first embodiment. FIG. 2 is a flowchart for explaining an example of the learning operation according to the first embodiment.

The signal processing unit 101 inputs the input signal 301 to the neural network used in the signal processing unit 101 and performs signal processing, and outputs the restoration signal 303 obtained by the signal restoration during learning (Step S101).

The converting unit 102 converts the restoration signal 303 and the correct signal 302 into post-conversion restoration signal 305 and the post-conversion correct signal 304 respectively (Step S102).

The loss calculating unit 103 calculates the loss related to the processing accuracy of the signal processing device 200 from the post-conversion restoration signal 305 and the post-conversion correct signal 304, (Step S103).

The learning unit 104 calculates the gradient based on the calculated loss, and updates the parameters of the neural network, which is used in the signal processing unit 101, based on the gradient (Step S104). The learning unit 104 determines whether or not to end the learning (Step S105). For example, if the parameter updating count has reached a predetermined repetition count, then the learning unit 104 can determine to end the learning.

If the learning is not to be ended (No at Step S105), then the system control returns to Step S101 and the subsequent operations are performed again. When the learning is to be ended (Yes at Step S105), the learning operation is ended.

Given below is the explanation about specific examples of the signal conversion and the calculated loss according to the first embodiment.

Sound Classification or Sound Recognition

Figure 3:
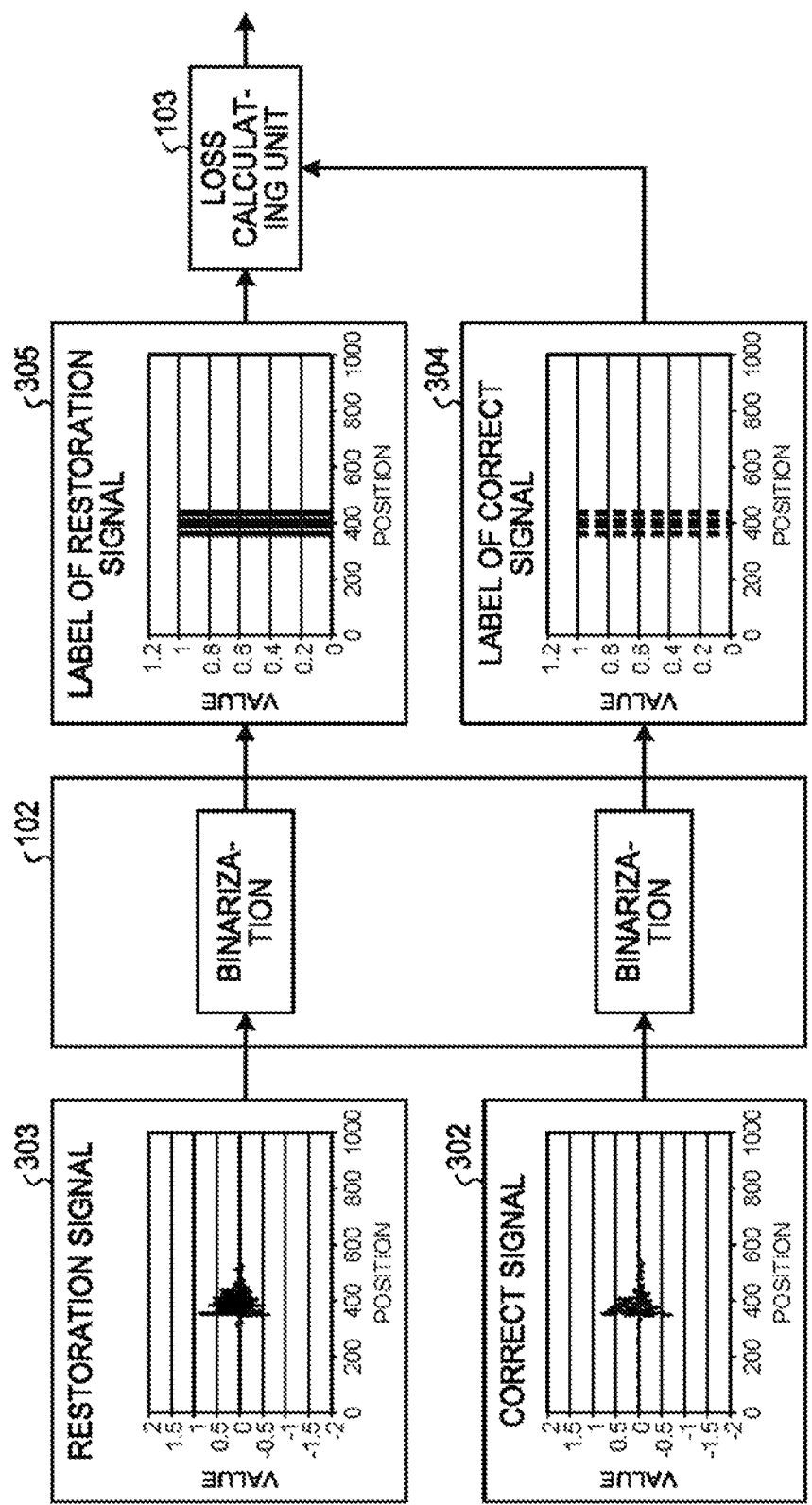
FIG. 3 is a diagram of a converting unit according to the first embodiment.

FIG. 3 is a diagram illustrating an exemplary configuration of the converting unit 102 according to the first embodiment. FIG. 3 illustrates an example in which the restoration signal 303 and the correct signal 302 representing sound signals are used. Namely, FIG. 3 illustrates an example in which the input signal 301 is a sound signal, and the signal processing performed by the signal processing device 200 is sound classification or sound recognition.

In this case, the signal restoration performed by the signal processing unit 101 is, for example, noise removal; and the restoration signal 303 represents a sound signal, the correct signal 302 represents a sound signal, the signal conversion performed by the converting unit 102 represents binarization, the post-conversion restoration signal 305 represents a binary signal, and the post-conversion correct signal 304 represents a binary signal.

The converting unit 102 converts the components of the post-conversion restoration signal 305 and the components of the post-conversion correct signal 304 into, for example, binary labels such as a noise component "0" and a signal component "1" according to the threshold value. Assuming that $y=\{y_1, y_2, \ldots, y_N | y_i \in 0, 1\}$ represents the post-conversion restoration signal 305, and $t=\{t_1, t_2, \ldots, t_N | t_i \in 0, 1\}$ represents the post-conversion correct signal 304, then N represents the number of dimensions of each signal. The loss calculating unit 103 calculates a true positive ratio TPR based on Equation (1) given below, and (1-TPR) as the loss. The true positive ratio TPR implies the ratio of correctly determining the true condition as true; and, in the case of two-class classification into the noise component and the signal component, is equivalent to the detection rate of the signal component.

$$TPR = \Sigma_i^N y_i t_i / \Sigma_j^N t_j \quad (1)$$

The learning unit 104 updates the parameters of the neural network used in the signal processing unit 101, in such a way that the calculated loss becomes smaller. As a result, the neural network used in the signal processing unit 101 is optimized for getting to restore the restoration signal 303, which improves the processing accuracy of the signal processing device 200.

However, the loss is not limited to the example given above and, for example, the false positive ratio can also be added to the loss. For example, the loss calculating unit 103 calculates a false positive ratio FPR according to Equation (2) given below, and the sum of (1-TPR) and the FPR as the loss. The learning unit 104 uses that loss and optimizes the parameters of the neural network used in the signal processing unit 101. Herein, the false positive ratio FPR implies the ratio of determining the false condition as true; and, in the case of two-class classification into the noise component and the signal component, is equivalent to the false detection rate of detecting the noise component as the single component.

$$FPR = \Sigma_i^N y_i |sign(t_i-1)| / \Sigma_j^N |sign(t_j-1)| \quad (2)$$

Image Classification or Image Recognition

For example, assuming that the input signal 301 represents an image, and the signal processing performed by the signal processing device 200 represents image classification or image recognition, then the signal restoration performed by the signal processing unit 101 represents noise removal, the restoration signal 303 represents an image, the correct signal 302 represents an image, the signal conversion performed by the converting unit 102 represents a combination of one or more of image classification and image recognition, and the post-conversion restoration signal 305 and the post-conversion correct signal 304 represent N-dimensional probability vectors that take values from 0 to 1 indicating the degrees of belongingness to N number of classes.

Assuming that $y=\{y_1, y_2, \ldots, y_N | 0 \leq y_i \leq 1\}$ represents the post-conversion restoration signal 305, and $t=\{t_1, t_2, \ldots, t_N | 0 \leq t_i \leq 1\}$ represents the post-conversion correct signal 304, the loss calculating unit 103 calculates cross entropy CE as the loss according to Equation (3) given below.

$$CE = \{-\Sigma_i^N y_i \log(t_i)\} \quad (3)$$

However, the loss is not limited to the example given above, and it is alternatively possible to use the KL divergence, the JS divergence, or the Wasserstein distance. Moreover, the loss calculating unit 103 can calculate the loss by combining two or more of the abovementioned items. For example, the loss calculating unit 103 can calculate ((cross entropy)+(KL divergence)/2) as the loss.

Segmentation or Captioning

For example, assuming that the input signal 301 represents an image, and the signal processing performed by the signal processing device 200 represents segmentation or captioning, then the signal restoration performed by the signal processing unit 101 represents noise removal, the restoration signal 303 represents an image, the correct signal 302 represents an image, the signal conversion performed by the converting unit 102 represents binarization, and the post-conversion restoration signal 305 and the post-conversion correct signal 304 represent binary-labeled images.

Assuming that $y=\{y_1, y_2, \ldots, y_N | y_i \in 0, 1\}$ represents the post-conversion restoration signal 305, and $t=\{t_1, t_2, \ldots, t_N | t_i \in 0, 1\}$ represents the post-conversion correct signal 304, the loss calculating unit 103 calculates the true positive ratio TPR according to Equation (1) given earlier, and (1-TPR) as the loss.

In an identical manner to sound classification or sound recognition, for example, the false positive ratio can also be added to the loss. For example, the loss calculating unit 103 calculates the false positive ratio FPR according to Equation (2) given earlier, and the sum of (1-TPR) and FPR as the loss.

Alternatively, for example, the signal conversion performed by the converting unit 102 can be either segmentation, or captioning, or clustering based on the pixel values; and the post-conversion restoration signal 305 and the post-conversion correct signal 304 can be multi-labeled images. Herein, in segmentation, input is an image, and each pixel in that image is assigned with a label implying the class of the object. In captioning, input is an image, and output is a text for explaining input image. In that case, the loss calculating unit 103 can calculate the IoU (Intersection of Union) for each class, and calculate the average value of all (1-IoU) as the loss. The IoU represents an index obtained by dividing the area of the common portion between the estimation area and the correct area by the sum of the estimation area and the correct area; and indicates that, closer to 1, the higher is the performance.

Machine Translation

For example, assuming that the input signal 301 represents a sound signal, and the signal processing performed by the signal processing device 200 represents machine translation, then the signal restoration performed by the signal processing unit 101 represents noise removal, the restoration signal 303 represents a sound signal, the correct signal 302 represents a sound signal, the signal conversion performed by the converting unit 102 represents binarization for labeling of sound or noise, and the post-conversion restoration signal 305 and the post-conversion correct signal 304 represent binary-labeled signals.

Assuming that $y=\{y_1, y_2, \ldots, y_N | y_i \in 0, 1\}$ represents the post-conversion restoration signal 305, and $t=\{t_1, t_2, \ldots, t_N | t_i \in 0, 1\}$ represents the post-conversion correct signal 304, the loss calculating unit 103 calculates the true positive ratio TPR according to Equation (1) given earlier, and (1-TPR) as the loss.

In an identical manner to sound classification or sound recognition, for example, the false positive ratio can also be added to the loss. For example, the loss calculating unit 103 calculates the false positive ratio FPR according to Equation (2) given earlier, and the sum of (1-TPR) and the FPR as the loss.

Given below is the explanation of a specific example of the signal processing performed by the signal processing unit 101 using a neural network. Examples of the signal processing performed by the signal processing unit 101 include the following: noise removal, super-resolution, object removal, blur removal, inpainting, artifact removal, speech enhancement, and a combination of two or more of the abovementioned operations.

Figure 4:
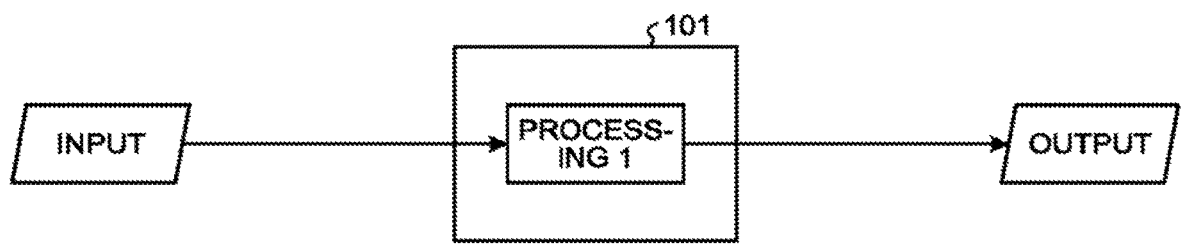
FIG. 4 is a diagram illustrating exemplary configurations of signal processing.
Figure 5:
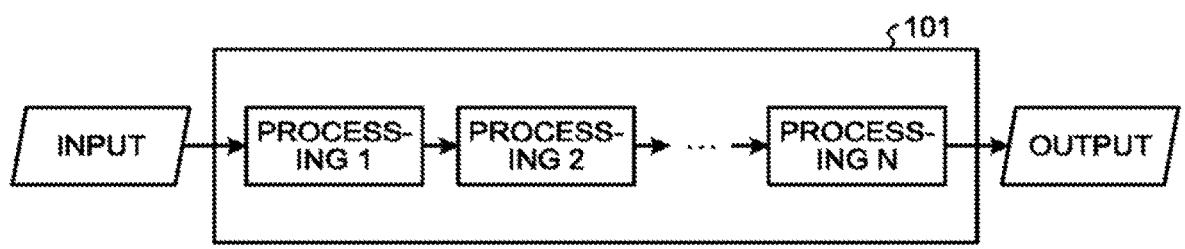
FIG. 5 is a diagram illustrating exemplary configurations of signal processing.
Figure 6:
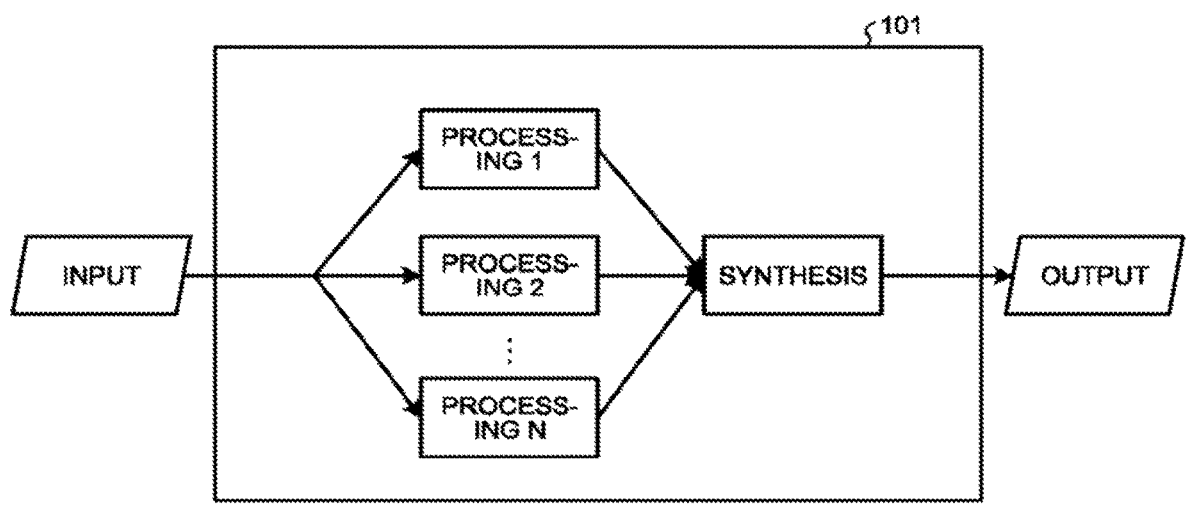
FIG. 6 is a diagram illustrating exemplary configurations of signal processing.
Figure 7:
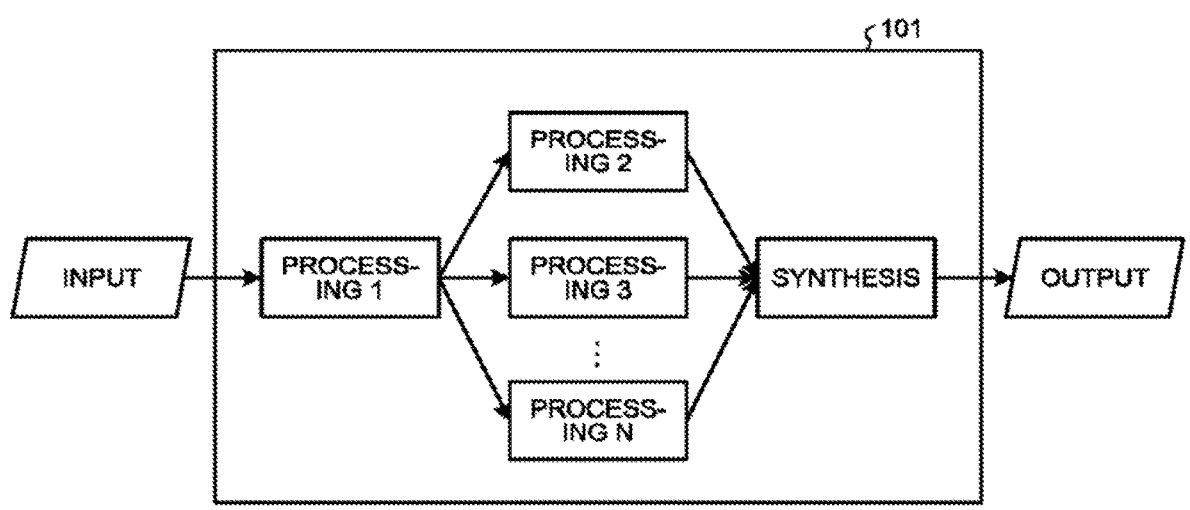
FIG. 7 is a diagram illustrating exemplary configurations of signal processing.

FIGS. 4 to 7 are diagrams illustrating exemplary configurations of signal processing. FIG. 4 illustrates an example in which a single instance of signal processing is implemented (single). FIG. 5 illustrates an example in which a plurality of instances of signal processing is sequentially implemented (series). FIG. 6 illustrates an example in which signal processing at each instance is performed on the input signal, and the processing results are merged at the end (parallel). FIG. 7 illustrates an example in which the series type and the parallel type are mixed (mixed). For example, with respect to an input signal having low resolution and a high noise level, the configuration can be such that super-resolution and noise removal are performed in series. As described above, regarding the signal processing performed by the signal processing device 200 too, there can be four patterns of configuration as illustrated in FIGS. 4 to 7.

In this way, in the signal processing device according to the first embodiment, the early-stage signal processing is learnt based on the loss related to the accuracy of the latter-stage signal processing. As a result, the latter-stage signal processing can achieve high accuracy.

Second Embodiment

In a signal processing device according to a second embodiment, the parameters of the neural network are optimized by further taking into account the loss calculated from the pre-conversion restoration signal and the pre-conversion correct signal.

Figure 8:
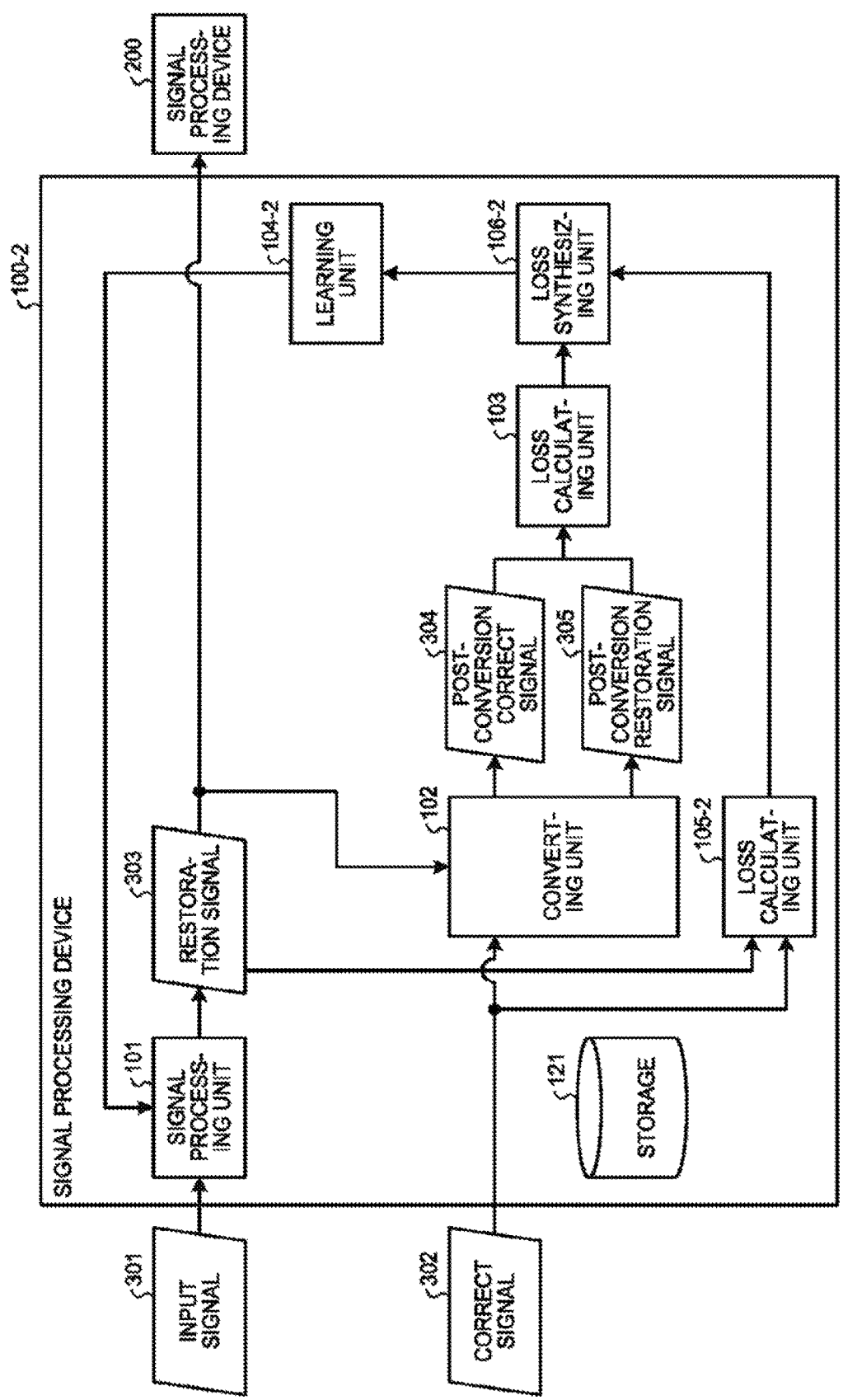
FIG. 8 is a block diagram of a signal processing device according to a second embodiment.

FIG. 8 is a block diagram illustrating an exemplary configuration of a signal processing device 100-2 according to the second embodiment. As illustrated in FIG. 8, the signal processing device 100-2 includes the signal processing unit 101, the converting unit 102, the loss calculating unit 103, a learning unit 104-2, a loss calculating unit 105-2, a loss synthesizing unit 106-2, and the storage 121.

As compared with the first embodiment, the second embodiment differs in the way that the loss calculating unit 105-2 and the loss synthesizing unit 106-2 are added, and that the function of the learning unit 104-2 is different. The remaining configuration and the functions are identical to FIG. 1 that is a block diagram of the signal processing device 100 according to the first embodiment. Hence, the same reference numerals are used, and the explanation is not repeated.

The loss calculating unit 10 calculates he loss (second-type loss) representing the inter-signal error based on the restoration signal 303 and the correct signal 302. The loss calculated by the loss calculating unit 105-2 can be set as an index using any one of following items or using a combination of two or more of the following items.
L1 loss
L2 loss
Charbonnier loss
Huber loss For example, when the signal processing performed by the signal processing device 200 is noise removal; the loss calculating unit 105-2 can treat, as the loss, either only the L2 loss or an index formed by combining the L1loss and the L2 loss via some calculation.

The loss synthesizing unit 106-2 synthesizes the loss calculated by the loss calculating unit 103 and the loss calculated by the loss calculating unit. 105-2 into a single value according to some calculation. For example, the loss synthesizing unit 106-2 multiplies a weight to at least either the first-type loss or the second-type loss, and then adds the first-type loss to the second-type loss. This weight need not to be fixed during the learning of the neural network, then the magnitude of the value can be dynamically varied depending on the progress of the learning. As a result, it can work as one of curriculum learning.

The learning unit 104-2 optimizes the parameters of the neural network based on the loss synthesized by the loss synthesizing unit 106-2. During the optimization of the neural network, the type of the loss can be switched more than once. For example, when the signal processing performed by the signal processing device 200 is noise removal, the learning unit 104-2 performs optimization using the L2 loss in the early stages of learning and using the L1 loss in the closing stages of learning. Herein, for the L2 loss, a greater penalty is imposed on a larger error. In contrast, for the L1 loss, the magnitude of the error and the penalty have a linear relationship. Hence, as a result of switching to the L1 loss in the closing stages of learning, it is expected that the fine structure of signals can be restored.

Figure 9:
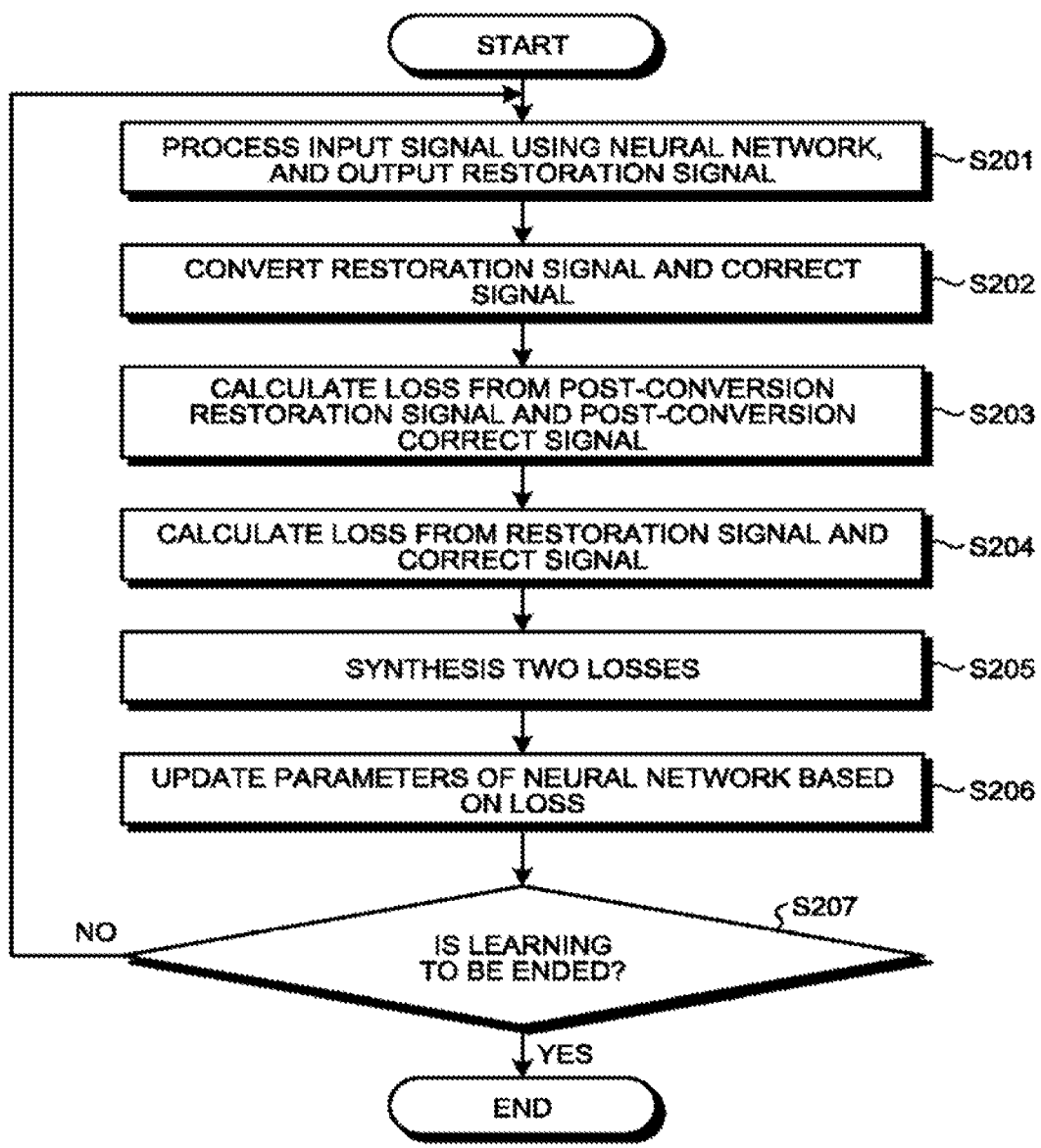
FIG. 9 is a flowchart for explaining an example of a learning operation according to the second embodiment.

Explained below with reference to FIG. 9 is a learning operation performed by the signal processing device 100-2 configured in the abovementioned manner according to the second embodiment. FIG. 9 is a flowchart for explaining an example of the learning operation according to the second embodiment.

The operations from Step S201 to Step S203 are identical to the operations performed from Step S101 to Step S103 by the signal processing device 100 according to the first embodiment. Hence, that explanation is not repeated.

The loss calculating unit 105-2 calculates the loss (second-type loss) based on the pre-conversion restoration signal 303 and the pre-conversion correct signal 302 (Step S204). The loss synthesizing unit 106-2 synthesizes the loss calculated at Step S203 and the loss calculated at Step S204 into a single value (Step S205). The learning unit 104 calculates the gradient based on the synthesized loss; and updates the parameters of the neural network used in the signal processing unit 101 based on the calculated gradient (Step S206).

The operation performed at Step S207 is identical to the operation performed at Step S105 by the signal processing device 100 according to the first embodiment. Hence, that explanation is not repeated.

Given below is the explanation of specific examples of the signal conversion and the calculated loss according to the second embodiment.

Sound Classification or Sound Recognition

Figure 10:
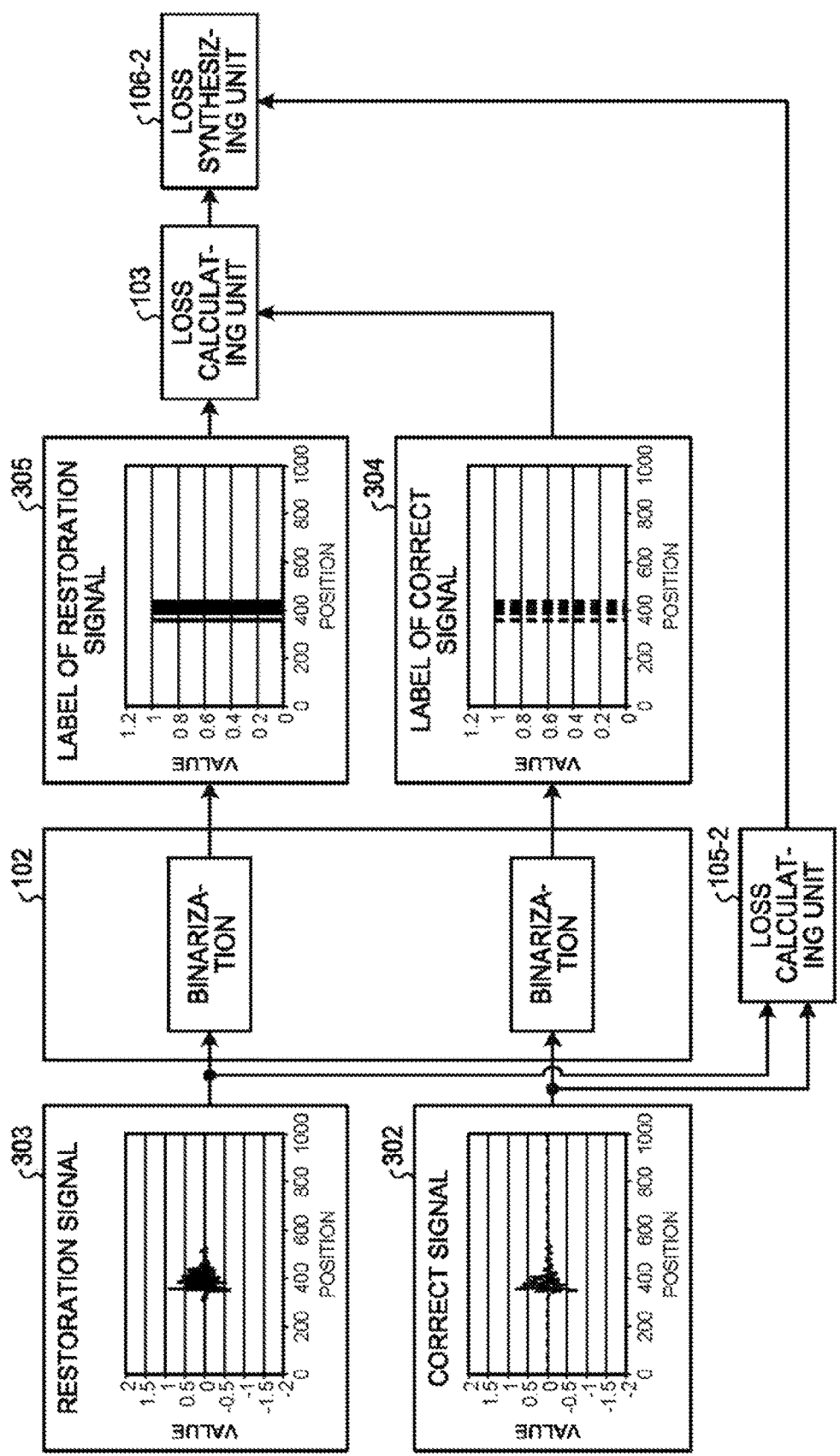
FIG. 10 is a diagram of a converting unit according to the second embodiment.

FIG. 10 is a diagram illustrating an exemplary configuration of the converting unit 102 according to the second embodiment. FIG. 10 illustrates an example in which the restoration signal 303 and the correct signal 302 representing sound signals. Namely, FIG. 10 illustrates an example in which the input signal 301 represents a sound signal, and the signal processing by the signal processing device 200 represents sound classification.

In that case, the signal restoration performed by the signal processing unit 101 represents, for example, noise removal; and the restoration signal 303 represents a sound signal, the correct signal 302 represents a sound signal, the signal conversion performed by the converting unit 102 represents binarization, the post-conversion restoration signal 305 represents a binary signal, and the post-conversion correct signal 304 represents a binary signal.

In an identical manner to the first embodiment, the loss calculating unit 103 calculates, for example, (1-TPR) as the first-type loss. The loss calculating unit 105-2 calculates the L2 loss as the second-type loss from the restoration signal 303 and the correct signal 302. The loss synthesizing unit. 106-2 synthesizes, for example, the weighted sum of the first-type loss and the second-type loss as the eventual loss. The learning unit 104 updates the parameters of the neural network used in the signal processing unit 101, in such a way that the calculated loss becomes smaller.

In an identical manner to the first embodiment, for example, the false positive ratio can also be added to the loss. For example, the loss calculating unit 103 calculates the false positive ratio FPR according to Equation (2) given earlier, and the sum of (1-TPR) and the FPR as the first-type loss.

Image Classification or Image Recognition

For example, assuming that the input signal 301 represents an image, and the signal processing performed by the signal processing device 200 represents image classification or image recognition, then the signal restoration performed by the signal processing unit 101 represents noise removal, the restoration signal 303 represents an image, the correct signal 302 represents an image, the signal conversion performed by the converting unit 102 represents an operation having a combination of one or more of image classification and image recognition, and the post-conversion restoration signal 305 and the post-conversion correct signal 304 represent N-dimensional probability vectors that take values from 0 to 1 indicating the degrees of belongingness to N number of classes.

In an identical manner to the first embodiment, the loss calculating unit 103 calculates, for example, the cross entropy CE as the first-type loss. The loss calculating unit 105-2 calculates the L2 loss as the second-type loss from the restoration signal 303 and the correct signal 302. The loss synthesizing unit 106-2 synthesizes the weighted sum of the first-type loss and the second-type loss as the eventual loss. The learning unit 104-2 updates the parameters of the neural network used in the signal processing unit 101, using the synthesized loss.

In an identical manner to the first embodiment, the first-type loss can be the KL divergence, the JS divergence, the Wasserstein distance, or a value obtained by combining two or more of the abovementioned items.

Segmentation or Captioning

For example, assuming that the input signal 301 represents an image, and the signal processing performed by the signal processing device 200 represents segmentation or captioning, then the signal restoration performed by the signal processing unit 101 represents noise removal, the restoration signal 303 represents an image, the correct signal 302 represents a multi-labeled image, the signal conversion performed by the converting unit 102 represents binarization, and the post-conversion restoration signal 305 and the post-conversion correct signal 304 represent binary-labeled images.

In an identical manner to the first embodiment, the loss calculating unit 103 calculates, for example, the true positive ratio as the first-type loss. The loss calculating unit 105-2 calculates the L2 loss as the second-type loss based on the restoration signal 303 and the correct signal 302. The loss synthesizing unit 106-2 synthesizes the weighted sum of the first-type loss and the second-type loss as the eventual loss. The learning unit 104-2 updates the parameters of the neural network used in the signal processing unit 101, based on the synthesized loss.

Meanwhile, for example, the false positive ratio can also be added to the loss. For example, the loss calculating unit 103 calculates the false positive ratio FPR according to Equation (2) given earlier, and the sum of (1-TPR) and the FPR as the loss.

Alternatively, for example, the signal conversion performed by the converting unit 102 can be either segmentation, or captioning, or clustering based on the pixel values; and the post-conversion restoration signal 305 and the post-conversion correct signal 304 can be multi-labeled images. In that case, the loss calculating unit 103 can calculate the IoU for each class, and calculate the average value of all (1-IoU) as the loss.

Machine Translation

For example, assuming that the input signal 301 represents a sound signal, and the signal processing performed by the signal processing device 200 represents machine translation, then the signal restoration performed by the signal processing unit 101 represents noise removal, the restoration signal 303 represents a sound signal, the correct signal 302 represents a vector of the machine translation result, the signal conversion performed by the converting unit 102 represents binarization, and the post-conversion restoration signal 305 and the post-conversion correct signal 304 represent binary-labeled signals.

In an identical manner to the first embodiment, the loss calculating unit 103 calculates, for example, (1-TPR) as the first-type loss. The loss calculating unit 105-2 calculates the L2 loss as the second-type loss based on the restoration signal 303 and the correct signal 302. The loss synthesizing unit 106-2 synthesizes the weighted sum of the first-type loss and the second-type loss as the eventual loss. The learning unit 104-2 updates the parameters of the neural network used in the signal processing unit 101, based on the synthesized loss.

In an identical manner to the first embodiment, for example, the false positive ratio can also be added to the loss. For example, the loss calculating unit 103 calculates the false positive ratio FPR according to Equation (2) given earlier, and the sum of (1-TPR) and the FPR as the first-type loss.

In this way, in the signal processing device according to the second embodiment, the parameters of the neural network can be optimized by taking into account the loss based on the pre-conversion restoration signal and the pre-conversion correct signal. As a result, the latter-stage signal processing can achieve high accuracy.

Third Embodiment

In this document the signal restoration is used as preprocessing for the signal processing device 200 installed in the latter stage. On the other hand, for example, on the perspective of the accountability about latter-stage operations, there is a situation require the explanation about result of the signal restoration. In order to deal with such a situation, in a third embodiment, the reliability of the restoration signal is calculated as output. For example, if the latter-stage operations are changed depending on reliability, a low reliability data can be properly processed then the obtained processing result can be more appropriate. The following explanation of the third embodiment is given about an example in which some functions are added to the first embodiment. Alternatively, the functions can be added to the second embodiment.

Figure 11:
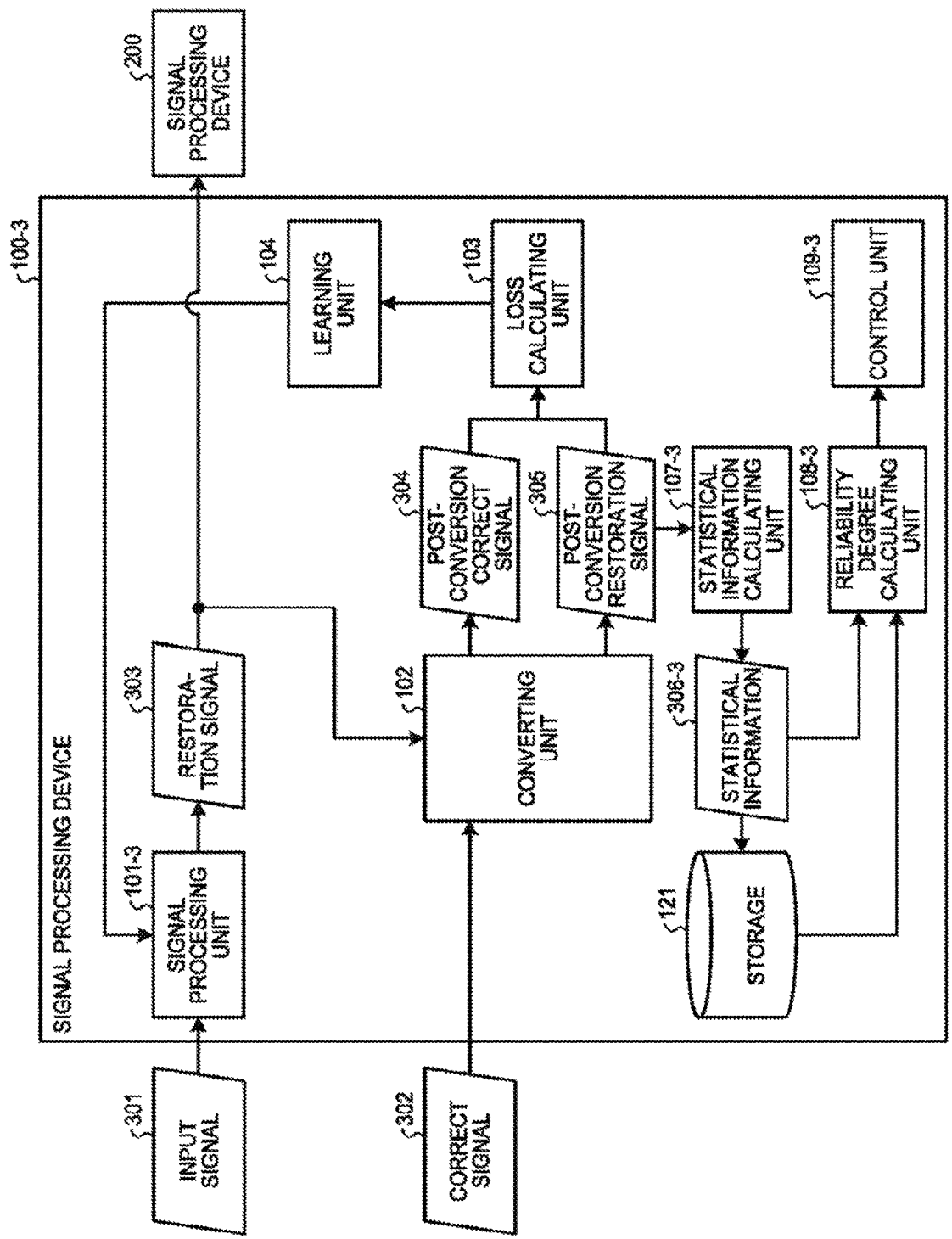
FIG. 11 is a block diagram of a signal processing device according to a third embodiment.

FIG. 11 is a block diagram illustrating an exemplary configuration of a signal processing device 100-3 according to the third embodiment. As illustrated in FIG. 11, the signal processing device 100-3 includes a signal processing unit 101-3, the converting unit 102, the loss calculating unit 103, the learning unit 104, a statistical information calculating unit 107-3, a reliability calculating unit 108-3, a control unit 109-3, and the storage 121.

As compared to the first embodiment, the third embodiment differs in the way that the statistical information calculating unit 107-3, the reliability calculating unit 108-3, and the control unit 109-3 are added; and the function of the signal processing unit 101-3 is different. The remaining configuration and the functions are identical to FIG. 1 that is a block diagram of the signal processing device 100 according to the first embodiment. Hence, the same reference numerals are used, and the explanation is not repeated.

The statistical information calculating unit 107-3 calculates statistical information of the post-conversion restoration signal 305. For example, at the time of learning, the statistical information calculating unit 107-3 calculates statistical information 306-3 of the post-conversion restoration signal 305 (all restoration signals included in a training signal set). Moreover, at the time of inference, the statistical information calculating unit 107-3 inputs the post-conversion restoration signal 305 (a single restoration signal representing the evaluation target), and calculates the statistical information 306-3 at the time of inference.

Based on the respective statistical information 306-3 at the time of learning and at the time of inference, the reliability calculating unit 108-3 calculates the reliability of the restoration signal 303 at the time of inference. The method for calculating the statistical information and the method for calculating the reliability are described later in detail.

The control unit 109-3 controls the signal processing, which is performed by the signal processing unit 101-3, according to, for example, the post-conversion restoration signal 305. For example, when the reliability calculated from the post-conversion restoration signal 305 is smaller than a predetermined threshold value, the control unit 109-3 controls in such a way that the signal processing unit 101-3 performs signal processing without using the neural network. In that case, the signal processing unit 101-3 outputs the processing result of the signal processing without using the neural network to the signal processing device 200.

When the reliability is smaller than the threshold value, the configuration can be such that the control unit 109-3 causes the signal processing unit 101-3 to repeatedly perform the signal restoration using the post-conversion restoration signal 305 as the input signal until the reliability becomes equal to or greater than the threshold value.

The signal processing unit 101-3 further differs from the signal processing unit 101 according to the first embodiment in the way of being capable of performing signal processing without using the neural network. For example, when the calculated reliability is smaller than the threshold value, the signal processing unit 101-3 performs the signal processing without using the neural network based on the instruction from the control unit 109-3. The signal restoration without using a neural network includes, for example, a signal restoration using a filter. Herein, the filter can be a Gaussian filter or a low-pass filter such as a median filter. When a multidimensional signal represents an image, a handcraft method such as BM3D (Block Matching and 3D Collaborative Filtering) can be implemented.

Explained below with reference to FIG. 12 is a statistical information calculation operation performed by the signal processing device 100-3 configured in the abovementioned manner according to the third embodiment. FIG. 12 is a flowchart for explaining an example of the statistical information calculation operation according to the third embodiment.

The statistical information calculating unit 107-3 calculates statistical information from the post-conversion restoration signal 305 at the time of learning (Step S301). Then, the statistical information calculating unit 107-3 stores the calculated statistical information in, for example, the storage 121 (Step S302). Alternatively, for example, the statistical information can be calculated by splitting the post-conversion restoration signal into success data and failure data. Still alternatively, the statistical information can be calculated from the post-conversion correct data.

Explained below with reference to FIG. 13 is a reliability calculation operation performed by the signal processing device 100-3 according to the third embodiment. FIG. 13 is a flowchart for explaining an example of the reliability calculation operation according to the third embodiment.

The statistical information calculating unit 107-3 calculates statistical information from the post-conversion restoration signal 305 at the time of inference (Step S401). The reliability calculating unit 108-3 calculates the reliability from the calculated statistical information and the statistical information stored in the storage 121 (Step S402). Alternatively, for example, when the statistical information is calculated by splitting the post-conversion restoration signal into success data and failure data at the time of learning, the reliability can be calculated from those two sets of statistical information and the statistical information at the time of inference. Then, based on the calculated reliability, the control unit 109-3 can control as described earlier.

Given below is the explanation of specific examples of the method for calculating the statistical information and the reliability.

Sound Classification or Sound Recognition

FIG. 14 is a diagram for explaining an example of the method for calculating the statistical information and the method for calculating the reliability. The upper portion of FIG. 14 illustrates an example of the post-conversion restoration signal 305 at the time of learning and an example of the calculated statistical information 306-3. The lower portion of FIG. 14 illustrates an example of the post-conversion restoration signal 305 at the time of inference, an example of the calculated statistical information 306-3, an example of a graph 1401 indicating the method for calculating the reliability, and an example of the calculated reliability 1402.

In this example, the input signal 301 represents a sound signal, the signal processing performed by the signal processing device 200 represents sound classification or sound recognition, and the post-conversion restoration signal 305 is a binary signal. In that case, the statistical information calculating unit 107-3 calculates the total value of the label "1" (the number of signal components) for each of a plurality of post-conversion restoration signals 305. Then, the statistical information calculating unit 107-3 calculates, a histogram indicating the frequency of each the total value as the statistical information 306-3. The histogram can be normalized in such a way that, for example, the greatest value of the frequency is equal to one.

At the time of inference, the statistical information calculating unit 107-3 calculates the total value of the label "1" for the post-conversion restoration signal 305 at the time of inference.

Based on the mean (Mean) and the standard deviation (SD) of the histogram of the statistical information 306-3 at the time of training, the reliability calculating unit 108-3 calculates the degree of separation from the mean (Mean) of the statistical information 306-3 at the time of learning of the sum (Sum) indicted by the statistical information as the reliability 1402 at the time of inference. For example, when Sum is greater than the Mean, the reliability is calculated as 1-max(0, Sum−Mean+SD). Similarly, when Sum is smaller than the Mean, the reliability is calculated as 1-max(0, Mean−SD−Sum).

With such a configuration, the reliability is obtained with respect to the restoration signal 303 at the time of inference.

Image Classification or Image Recognition

For example, assuming that the input signal 301 represents an image, the signal processing performed by the signal processing device 200 represents image classification or image recognition, and the post-conversion restoration signal 305 represents a probability vector of the classification result, the statistical information calculating unit 107-3 calculates the average of the probability vectors of each class as the statistical information 306-3.

At the time of inference, the statistical information calculating unit 107-3 calculates the probability vector of the post-conversion restoration signal 305 as the statistical information 306-3 at the time of inference. Based on the respective statistical information 306-3 at the time of learning and at the time of inference, the reliability calculating unit 108-3 calculates the inter-distribution distance such as the cross entropy as the reliability.

For example, when the distance between the probability vector of classification result at the time of inference and the average of the probability vectors at the time of learning is large, it implies that the restoration signal 303 has a low reliability.

Segmentation

For example, assuming that the input signal 301 represents an image, the signal processing performed by the signal processing device 200 represents segmentation, and the post-conversion restoration signal 305 represents a multi-labeled image, the statistical information calculating unit 107-3 calculates the total number of pixels (pixel count) assigned with the concerned label for each of a plurality of labels. Then, the statistical information calculating unit 107-3 calculates a histogram indicating the frequency for each pixel count as the statistical information 306-3. Herein, the histogram is calculated for each label. Moreover, the histogram can be normalized in such a way that, for example, the greatest value of the frequency is equal to one.

At the time of inference, the statistical information calculating unit 107-3 calculates the sum of the pixel counts of the labels of the post-conversion restoration signal 305 at the time of inference as the statistical information 306-3. Then, the reliability calculating unit 108-3 calculates the frequency of the histogram corresponding to the sum of the pixel counts and the average of the calculated frequencies as the reliability for each label.

For example, if the pixel count of the pixels having "person" as the label is greater than the pixel count at the time of learning, then it can be inferred that segmentation may have failed due to the failure in signal restoration.

Captioning

For example, assuming that the input signal represents an image, the signal processing performed by the signal processing device 200 represents captioning, and the post-conversion restoration signal 305 represents a vector of words of the captioning result, the statistical information calculating unit 107-3 calculates the number of appearances of that word for each word indicating the captioning result. Then, the statistical information calculating unit 107-3 calculates a histogram indicating the frequency of the number of appearances of each word as the statistical information 306-3. Herein, the histogram is calculated for each word. Moreover, the histogram can be normalized in such a way that, for example, the greatest value of the frequency is equal to one.

At the time of inference, the statistical information calculating unit 107-3 calculates the number of appearances of each word of the post-conversion restoration signal 305 at the time of inference as the statistical information 306-3. The reliability calculating unit 108-3 calculates the frequency of the histogram corresponding to the number of appearances of that word and the average of the calculated frequencies as the reliability for each word.

For example, when a word having a small number of appearances at the time of learning is included in the restoration signal 303 at the time of inference, it is predicted that there is a possibility of false recognition due to the effect of noise (under the assumption that the target image group belongs to a common category).

Machine Translation

For example, assuming that the input signal 301 represents a sound signal, the signal processing performed by the signal processing device 200 represents machine translation, and the post-conversion restoration signal 305 represents a vector of words of the machine translation result, the statistical information calculating unit 107-3 calculates the number of appearances of each word indicating the machine translation result. Then, the statistical information calculating unit 107-3 calculates a histogram indicating the frequency of the number of appearances of each word as the statistical information 306-3. Herein, the histogram is calculated for each word. Moreover, the histogram can be normalized in such a way that, for example, the greatest value of the frequency is equal to one.

At the time of inference, the statistical information calculating unit 107-3 calculates the number of appearances of each word of the post-conversion restoration signal 305 at the time of inference as the statistical information 306-3. The reliability calculating unit 108-3 calculates the frequency of the histogram corresponding to the number of appearances of that word and the average of the calculated frequencies as the reliability for each word.

For example, when a word having a small number of appearances at the time of learning is included in the restoration signal 303 at the time of inference, it is predicted that there is a possibility of false recognition due to the effect of noise (under the assumption that the target image group belongs to a common category).

In this way, in the signal processing device according to the third embodiment, for example, the reliability of the restoration signal can be obtained at the time of inference.

First Modification Example

The correct signal may not be subjected to conversion by the converting unit 102. For example, a signal that has been already converted into the format of the post-conversion correct signal can be treated as the correct signal 302, and the converting unit 102 need not perform the signal conversion with respect to the correct signal 302. In the case of the second embodiment, a signal that has been already converted into the format of the post-conversion correct signal 304 and a signal that has the same format as the format of the correct signal with respect to the restoration signal 303 can be treated as the two correct signals 302, and the converting unit 102 can be configured to not perform the signal conversion with respect to the correct signals 302.

As described above, according to the first to third embodiments, the latter-stage signal processing which uses the output signal of the early-stage signal processing can achieve high accuracy. Moreover, according to the first to third embodiments, learning can be done in such a way that signal components are prevented from being suppressed.

Figure 15:
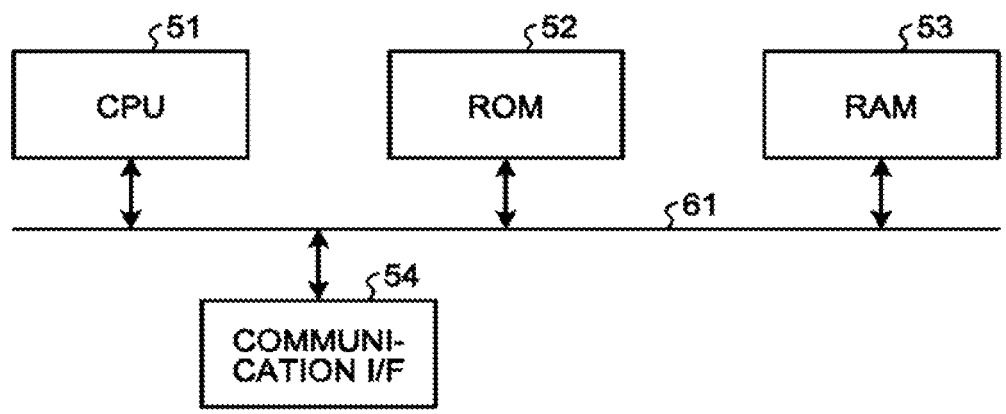
FIG. 15 is a hardware configuration diagram of the signal processing device according to the first to third embodiments.

Explained below with reference to FIG. 15 is a hardware configuration of the signal processing device according to the first to third embodiments FIG. 15 is an explanatory diagram for explaining an exemplary hardware configuration of the signal processing device according to the first to third embodiments.

The signal processing device according to the first to third embodiments includes a control device such as a CPU 51; memory devices such as a read only memory (ROM) 52 and a RAM 53; a communication interface (I/F) 54 that establishes communication with a network and performs communication; and a bus 61 that connects the abovementioned constituent elements to each other.

A computer program executed in the signal processing device according to the first to third embodiments is stored in advance in the ROM 52.

Alternatively, the computer program executed in the signal processing device according to the first to third embodiments can be recorded as an installable file or an executable file in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer program executed in the signal processing device according to the first to third embodiments can be stored in a downloadable manner in a computer connected to a network such as the Internet. Still alternatively, the computer program executed in the signal processing device according to the first to third embodiments can be distributed via a network such as the Internet.

The computer program executed in the signal processing device according to the first to third embodiments makes a computer function as the constituent elements of the signal processing device. In that computer, the CPU 51 can read the computer program from a computer-readable memory medium into a main memory device, and execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing device comprising:
one or more processors configured to:
perform first-type signal processing on an input signal using a neural network, and output a first-type output signal;
convert the first-type output signal into a second-type output signal for calculating a first-type loss related to accuracy of second-type signal processing performed by another signal processing device;
calculate the first-type loss based on the second-type output signal and a correct signal; and
optimize parameters of the neural network based on the first-type loss.

2. The signal processing device according to claim 1, wherein the one or more processors:
calculate the first-type loss based on the second-type output signal and a correct signal that is converted into the first-type loss,
calculate a second-type loss based on the first-type output signal and a correct signal that is not converted into the first-type loss, and
optimize the parameters based on the first-type loss and the second-type loss.

3. The signal processing device according to claim 2, wherein, depending on progress of learning, the one or more processors vary a weight of at least one of the first-type loss and the second-type loss.

4. The signal processing device according to claim 1, wherein the correct signal represents a signal that has been converted into the first-type loss.

5. The signal processing device according to claim 1, wherein the one or more processors convert the first-type output signal by a conversion method specified by the other signal processing device.

6. The signal processing device according to claim 1, wherein the one or more processors:
calculate statistical information of the second-type output signal; and
based on first-type statistical information calculated from a plurality of second-type output signals corresponding to a plurality of input signals used in learning and second-type statistical information calculated from a second-type output signal corresponding to an input signal used in inference, calculate reliability of the first-type output signal corresponding to the input signal used in inference.

7. A signal processing method comprising:
performing, by a signal processing device, first-type signal processing on an input signal using a neural network, and outputting a first-type output signal;
converting, by the signal processing device, the first-type output signal into a second-type output signal for calculating a first-type loss related to accuracy of second-type signal processing performed by another signal processing device;
calculating, by the signal processing device, the first-type loss based on the second-type output signal and a correct signal; and
optimizing, by the signal processing device, parameters of the neural network based on the first-type loss.

8. A computer program product having a non-transitory computer readable medium including programmed instructions, wherein the instructions, when executed by a computer, cause the computer to perform:
performing first-type signal processing on an input signal using a neural network, and outputting a first-type output signal;
converting the first-type output signal into a second-type output signal for calculating a first-type loss related to accuracy of second-type signal processing performed by another signal processing device that is different from the computer;
calculating the first-type loss based on the second-type output signal and a correct signal; and
optimizing parameters of the neural network based on the first-type loss.

9. A signal processing device comprising:
one or more processors configured to:

perform first-type signal processing on input signals using a neural network, and output a first-type output signals;

convert the first-type output signals into a second-type output signals for calculating a first-type loss related to accuracy of second-type signal processing performed by another signal processing device; and control signal processing to be performed, according to the second-type output signals corresponding to the input signals used in learning of parameters of the neural network performed by using the first-type loss.

\* \* \* \* \*